Sept. 15, 1970  J. D. A. DAY  3,529,235
MAGNETIC INDUCTION SPECTROMETER EMPLOYING A PAIR
OF COUPLED RESONANT CAVITIES
Filed July 10, 1968  2 Sheets-Sheet 1

INVENTOR.
John D. Allen Day
BY Flehr, Hohbach, Test,
Albritton & Herbert
Attorneys

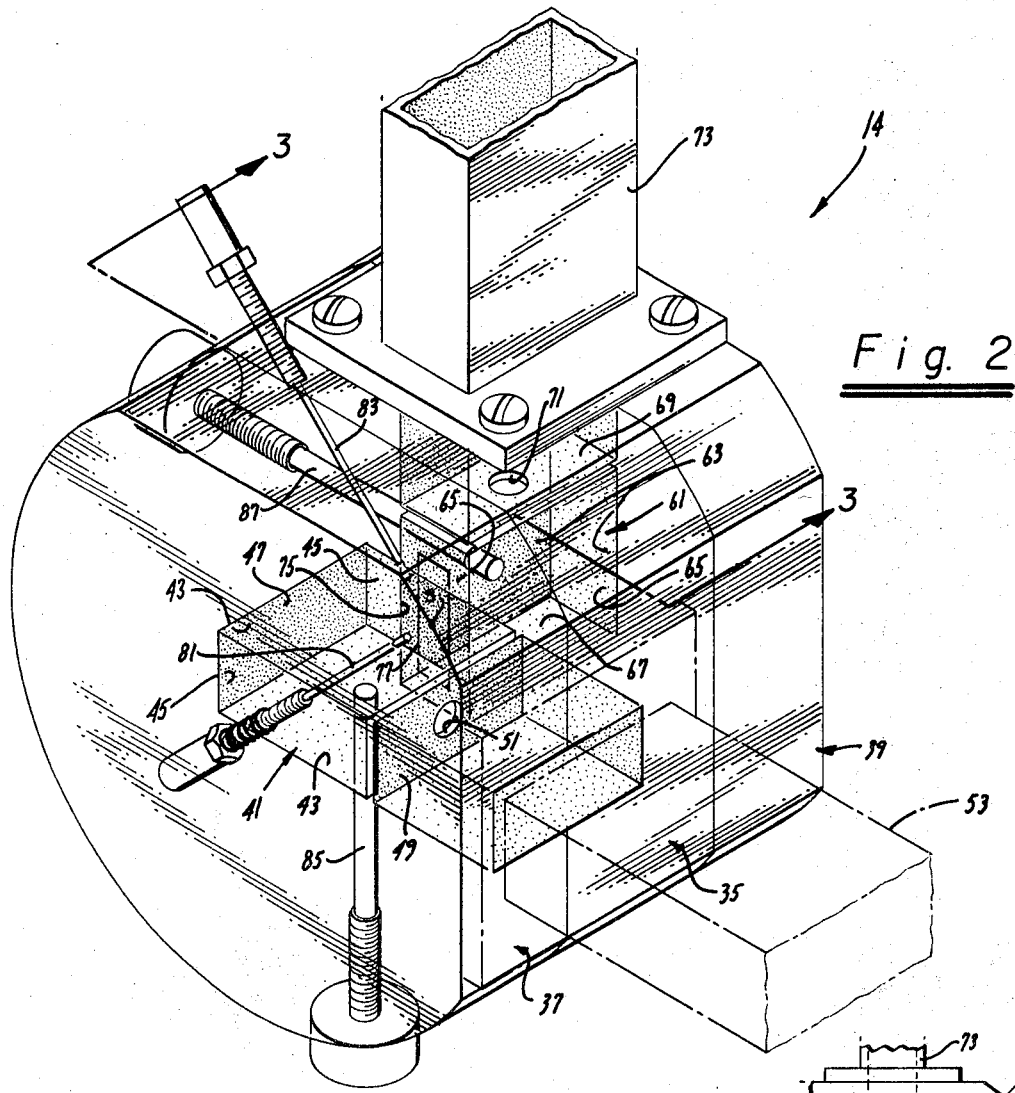
Fig. 2
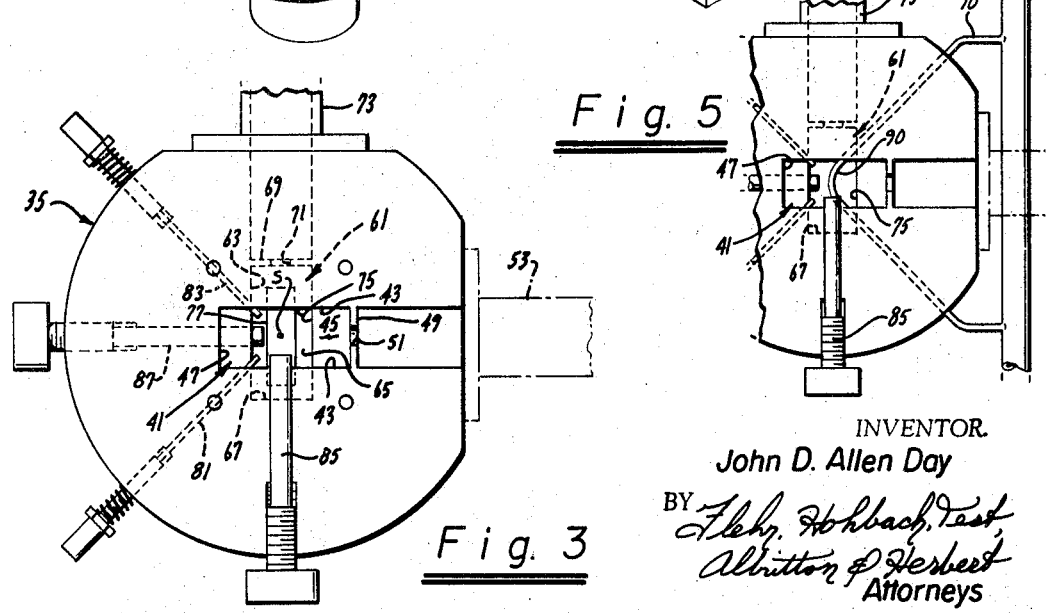
Fig. 3
Fig. 5
INVENTOR.
John D. Allen Day

United States Patent Office 3,529,235
Patented Sept. 15, 1970

3,529,235
MAGNETIC INDUCTION SPECTROMETER EMPLOYING A PAIR OF COUPLED RESONANT CAVITIES
John D. Allen Day, Berkeley, Calif., assignor to E-H Research Laboratories, Inc., Oakland, Calif., a corporation of California
Filed July 10, 1968, Ser. No. 743,881
Int. Cl. G01n 27/78
U.S. Cl. 324—.5                          6 Claims

ABSTRACT OF THE DISCLOSURE

A spectrometer for analyzing magnetic spin resonance in the presence of a DC magnetic biasing field including a pair of electromagnetic cavities having orthogonal magnetic field relations in a common coupling region at which the electric fields are at a null. The DC biasing field is arranged orthogonal to the magnetic fields at the coupling region. The sample is positioned in the coupling region and serves to transfer energy between the cavity at the sample resonance in the DC magnetic field. Decoupling screws are used to reduce the coupling between the cavities and thereby reduce system noise.

BACKGROUND OF THE INVENTION

This invention relates to electron spin resonance spectrometers and particularly to such spectrometers that operate on an induction technique.

As known, electron spin resonance spectrometers operate on a technique wherein a microwave electromagnetic field in a cavity interacts with a sample in the presence of a DC magnetic biasing field. The interaction of the sample with the electromagnetic field is then investigated as a function of the bias field strength and is characteristic of the permitted electron transitions of the sample.

In general, previous electron spin resonance spectrometers have made use of the fact that the resonance results in small changes to the magnetic susceptibility of the sample and hence changes the electrical characteristics of the cavity. In the past, both transmission and reflection type systems have been used. In the transmission system, the detector receives all the power generated by the source and, since the required signal is a very small perturbation, the detector saturates very easily and is therefore severely limited in sensitivity. Furthermore, a significant uncertainty in the accuracy of the received signal can be caused by AM noise riding on the input signal to which such systems are sensitive and which cannot be eliminated.

In the reflection system the sample causes a reflection of energy from the cavity and it is possible to balance out AM noise to a negligible level. However, FM noise from the klystron power supply is demodulated by the cavity. In other words, a change in the frequency of the source as, for example, due to vibration will result in a change in the amount of the reflected power due to detuning of the cavity. Hence, FM modulation from the source becomes AM modulation when reflected from the cavity and contributes to the uncertainty and the amount of received signal. Even so, saturation of the sample still is a limitation because of the inability to balance the reflection cavity to anything better than about 30 db.

None of the systems referred to are adapted to operate on a continuous basis as would be desirable in production line testing. This is because the electric and magnetic fields are affected by the dielectric constant of the sample in the cavity. When the dielectric constant of the sample changes, the tuning of the cavity, and its Q, is also changed a large amount. Significant changes in dielectric constant can easily result from air bubbles in the sample or changes in sample temperature.

A magnetic induction spectrometer makes use of the fact that the change in susceptibility of the sample caused by the resonance is circularly polarized and can be used to change the coupling between orthogonal electromagnetic fields. The technique is well-known for nuclear magnetic resonance in which case the frequency of resonance is a few megahertz and RF magnetic fields of the required orientation are easily obtained. The use of this principle for electron spin resonance has been limited by the lack of suitable apparatus for generating the required RF fields.

There is, therefore, a need for a new and improved magnetic induction spectrometer.

SUMMARY OF THE INVENTION AND OBJECTS

In general, it is an object of the present invention to provide an improved magnetic induction spectrometer which will overcome the above-mentioned limitations and disadvantages.

Another object of the invention is to provide a spectrometer of the above character which is relatively insensitive to changes in the dielectric constant or other properties of the sample being investigated and which is particularly adapted for continuous use as in production line sampling and testing.

Another object of the invention is to provide a spectrometer apparatus of the above character which is relatively insensitive to AM or FM noise on the input signal and which does not generate modulation noise due to such input noise.

Another object of the invention is to provide a spectrometer which can be balanced to a high degree and which is substantially frequency insensitive after being balanced.

Another object of the invention is to provide a spectrometer of the above character in which there is little or no increase in the noise level when the incident power is increased up to the maximum available.

Another object of the invention is to provide an improved spectrometer of the above character which is particularly stable and which, therefore, permits long running times which may be required for investigating easily saturated transitions in samples.

In general, the above objects are provided by utilizing a two cavity system in which there are provided first and second electromagnetic cavities which are coupled together through an iris at which the electric field is zero for each cavity. The electromagnetic properties of the cavities are selected so that the magnetic field vectors of the electromagnetic field at the iris is a maximum for each of the cavities and furthermore is arranged so that such magnetic field vectors are orthogonal to each other. The cavities are positioned in a DC biasing magnetic field in such a way that the biasing field is orthogonal to each of the orthogonal magnetic field vectors of the cavities at the iris. Normally the cavities do not communicate electro-magnetically with each other since the magnetic fields are uncoupled by being orthogonal and the electric fields are zero.

A sample to be investigated is positioned at the iris by suitable means as by a holder, or if a fluid or gas, by suitable piping. The action of the incident microwave field on the sample at a predetermined excitation frequency and bias field in one cavity causes the magnetic spin of the sample to precess about the bias field. This, in turn, creates a small componoent of microwave energy which is aligned with the magnetic field direction for propagation in the second cavity. Thus, for certain relationship between the bias field and the microwave field which is characteristic of the sample, energy will be coupled into the second cavity from which it is easily extracted and analyzed.

These and other objects and features of the invention will become apparent from the following description and claims when taken in conjunction with the accompanying drawings.

BRIEF DESCRIPTION OF THE DRAWINGS

FIG. 2 is an isometric view partially in phantom of a cavity arrangement constructed according to the invention.

FIG. 3 is a plan view taken along the lines 3—3 of FIG. 2 with the top of the cavity structure removed.

FIG. 4 is a schematic view of the cavity structure emphasizing the electromagnetic and biasing field distribution.

FIG. 5 is a partial view of a modified cavity resonator constructed according to the invention.

DETAILED DESCRIPTION OF THE INVENTION

Figure 1:
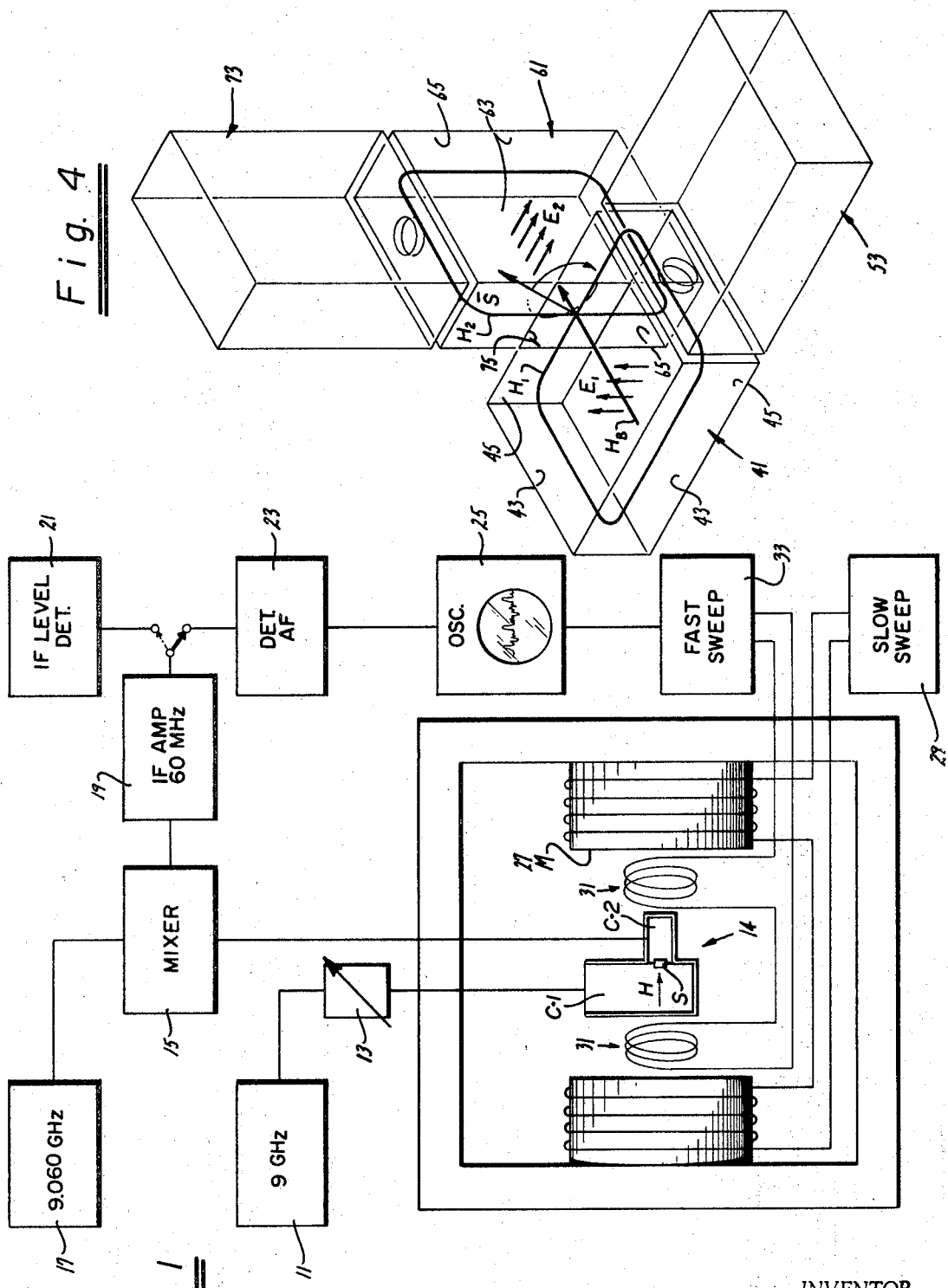
FIG. 1 is a schematic diagram of a magnetic induction spectrometer apparatus constructed according to the invention, and showing the electric circuit portions thereof in block diagram form.

Referring now to FIG. 1, there is shown in schematic and block diagram form a resonance spectrometer of the invention and which utilizes a superheterodyne receiving system. In the following description the transmitted microwave energy will be designated at 9 gHz., the IF frequency at 60 mHz., and fast sweep times at 500 Hz. These values are used herein for illustrative purposes only as it is apparent that other frequencies may be substituted as may be convenient without departing from the invention.

A klystron source 11 of suitable high frequency energy such as 9 gHz., delivers the input microwave power for the spectrometer system through an attenuator 13 which controls the power level. The output of attenuator 13 is connected to a cavity resonator 14 including first electromagnetic cavity C-1 tuned to resonance at 9 gHz. The resonator also includes a second cavity C-2 which is coupled to cavity C-1 through the samples to be investigated. The second cavity C-2 is also tuned to resonance at the input signal, 9 gHz., but energy does not normally pass between cavities C-1 and C-2 cavities for reasons which will be explained in connection with the detailed explanation of the structure of the cavities and samples.

The entire cavity structure is positioned in a DC magnetic biasing field created by magnet M and associated circuitry, as will be further explained. For certain critical magnetic biasing fields, sample S couples energy from between cavities C-1 and C-2. The output of cavity C-2 is connected to one input of a mixer stage 15, the other input of which is connected to the output from a local oscillator 17 which differs in frequency from the input microwave power by an appropriate intermediate frequency. Thus, a 9.060 gHz. local oscillator causes a 60 mHz. IF frequency to appear at the mixer 15 output which is applied to an IF amplifier 19.

The output of the IF amplifier 19 is selectively connected to a first detector 21 which serves to detect the DC level of the 60 mHz. IF output and is a direct indication of the level of the signal coming from the cavity C-2 and is used for the purpose of making adjustments to the microwave circuit, as will be hereinafter described. A signal detector 23 is also connected to the output of the IF amplifier 19 and serves to detect the AC modulation which is present on the IF frequency signal and to supply it for display to an oscilloscope 25.

The cavities C-1, C-2 are disposed in a biasing magnetic field which is developed betwen the opposed pole faces of a large magnet 27. Magnet 27 is driven by a power supply 29 which also serves to vary its output at a slow sweep rate. A fast sweep field is created by sweep coils 31 which are driven at a suitable AF frequency, such as 500 Hz., developed by an oscillator and amplifier 33 which is also used as sweep of oscilloscope 25. The general construction of such a spectrometer system including the details of the sweep magnetic bias fields and circuits as well as the microwave and intermediate frequency circuits and display networks are sufficiently well known that further description herein is not required. Reference is made to the extensive literature on the subject for the details of such circuits; see for example Microwave Engineering by A. F. Harvey, Academic Press 1963, page 305 ff. and references cited therein.

Referring now to FIGS. 2 to 4, there is shown in detail the cavity resonator 14 constructed in accordance with the invention. The biasing magnetic field H is indicated to show the orientation relative to the gap in magnet 27. The structure consists of nonmagnetic housing parts which are constructed of a suitable machinable plastic which is then given a surface plating of conductive material such as copper.

The cavity resonator 14 is constructed in three sections, an intermediate section 35 and outer sections 37 and 39 positioned on either side of section 35. Section 35 and outer section 37 are machined with mating slots which form a rectangular section 41 of waveguide having broad walls 43, short walls 45 and extend inwardly to an end wall 47. A conductive plate 49 is positioned across the slot to cooperate with section 41 and end wall 47 to form electromagnetically resonant cavity C-1. Plate 49 contains a circular iris 51 for admitting energy into the unit from input waveguide transmission line 53 which is connected to attenuator 13.

Likewise, the intermediate section 35 and outer section 39 are provided with mating slots which form a rectangular section 61 of waveguide having broad walls 63, short walls 65 and terminates in an end wall 67. A conductive plate 69 having an input iris 71 therein is positioned in the waveguide section and cooperates therewith and with end wall 67 to form cavity C-2. Section 61 is connected to an output waveguide transmission line 73 which connects to the output of mixer 15.

As shown, particularly in FIG. 2, the sidewalls 45 and 65 of the cavities intersect in a common surface region having planar form which forms a rectangular passage or iris 75 which connects between cavities C-1 and C-2. Means such as a tape strip 77 mounts a sample S in iris 75.

Cavities C-1 and C-2 are selected and arranged so that they are substantially decoupled at iris 75, the magnetic fields configuration of each cavity being orthogonal and the electric field being zero. This is achieved in the practical realization illustrated by selecting the rectangular $TE_{011}$ mode for each cavity. The electric field of this mode extends between the broad walls and is zero at the narrow walls and is surrounded by one loop of magnetic field which lies in a plane parallel to the broad walls. Thus, for cavities which are tangent and orthogonal along narrow sidewalls 45, 65 as shown in FIGS. 2 and 3, the magnetic field $H_1$ of cavity C-1 is orthogonal to that $H_2$ of the other cavity C-2 at the region of iris 75. Additionally, the cavity resonator is arranged within the biasing magnetic field $H_B$ so that the bias field intersects iris 75 orthogonal to both of the magnetic field components $H_1$ and $H_2$ within each of the cavities. Accordingly, when properly tuned to eliminate leakage fields, electromagnetic energy does not couple between the cavities and there is a theoretically infinite isolation between them.

Means is provided for minimizing the coupling between the cavities through the iris 75 and comprises adjusting slugs 81, 83 made of conductive or dielectric material positioned so as to be movable in a plane tangent to the surface of the coupling iris 75 and making approximately equal angles to the microwave magnetic field lines of each of the cavities at the coupling iris. Decoupling is achieved by moving the adjusting slugs in or out of iris 75 to obtain a minimum in the amount of IF signal indicated by detector 21.

Means is provided for tuning each of the cavities to thereby peak its response to the preselected frequency of operation. Such means consists of dielectric tuning stubs 85, 87 each one of which is adjustably passed through the resonator structure to extend into one of the cavities in the middle of a broad wall. These tuning stubs are adjusted to obtain a maximum indication from detector 12.

In operation, the resonator 14 is disassembled and the sample is positioned at the coupling iris 75 as by being attached to nonmagnetic tape 77. After positioning of the sample, the cavity structure is reassembled and connected to the input and output microwave transmission lines 53, 73. The 9 GHz input microwave frequency is then applied to cavity C–1 and some leakage occurs between the cavities so that some energy will appear at cavity C–2 output and will be amplified in the IF amplifier 19 and be detected by the IF detector 21. This energy is maximized by tuning cavities C–1 and C–2 with the dielectric tuning stubs 85, 87 and the broad walls to maximize the amount of received signal. Thereafter, the iris adjusting slugs 81, 83 are adjusted to minimize the amount of received signal which leaks through the coupling iris 75. This is accomplished by noting the minimum in the IF detector 21 output.

The magnetic biasing including sweep fields is then applied to the resonator and sample. The sweep signal is applied to the display oscilloscope 25 which displays audiofrequency component in the output frequency from cavity C–2 as a function of the sweep field. This component results from the coupling by the sample of magnetic fields between cavities for the sample resonance condition. Referring to the diagram shown in FIG. 4, the sample spins are designated by vector S and become oriented in particular positions determined by the orientation of swept bias magnetic field $H_B$. For specific critical frequency of excitation by the driving field $H_1$, the sample spins will precess about the bias field $H_B$ as diagrammatically indicated in FIG. 4. Such precession will develop a component of magnetic field in alignment with the potential magnetic field $H_2$ in cavity C–2 and will, accordingly, excite the cavity C–2 to develop a detectable signal in the output circuit. As is known, this signal has an audiofrequency component related to the fast sweep frequency and is interpreted in a conventional manner.

The cavity arrangement of the present invention is particularly advantageous because frequency modulation of the cavities by vibration or by changes in the dielectric constant of the sample have an extremely small effect on the output, making the instrument very stable. Thus, as shown in FIG. 5, a dielectric tube 90 can be used to permit fluid stream flow of sample through iris 75 in the region between the cavities. By way of example, a liquid sample can be continuously flowed through tube 90 to conduct continuous onstream sampling and testing of the liquid notwithstanding changes in its dielectric constant or components of different phase (bubbles) within the liquid.

For the same reason, frequency modulated signals from the signal source 11 are not demodulated and thereby enable full power to be employed from a source that is not highly stabilized without deterioration of the output signal. In addition, the power level at the detector is held at a low level with a consequent attenuation of AM noise similar to the reflection cavity but without the instability or FM noise disadvantage of the latter.

I claim:

1. In a spectrometer for analyzing magnetic resonance of a sample by microwave induction in the presence of a DC magnetic biasing field, means forming a first electromagnetic cavity resonant at a predetermined frequency related to the characteristic of said sample in said magnetic biasing field, means forming a second electromagnetic cavity resonant at said predetermined frequency, means coupling said cavities together in a common surface region in such a manner that the magnetic field lines of said electromagnetic fields in said first cavity and said second cavity are orthogonal to each other at said common surface region, said last named means also forming an iris for communicating between said cavities at said common surface region, said cavities remaining substantially decoupled due to the orthogonal relation of said magnetic field lines, means for supporting a sample in the region of said iris, means for applying a DC magnetic bias field normal to said iris so that as the sample magnetic spin is driven into a precession about said DC magnetic bias field by the microwave excitation from said first cavity, a component of said magnetic spin excites the electromagnetic field in said second cavity, and means for varying the strength of said DC magnetic biasing field.

2. A spectrometer as in claim 1 wherein said cavities are rectangular $TE_{011}$ mode cavities arranged with short walls lying in a common plane and orthogonally intersecting each other midway along each of said short walls, said iris being formed at the intersection of said walls in said plane.

3. A spectrometer as in claim 1, wherein each of said cavities is provided with a tuning slug for precisely tuning its frequency of resonance.

4. A spectrometer as in claim 3 wherein said iris is rectangular and extends throughout the area of said common surface region.

5. A spectrometer as in claim 4 further including means for minimizing extraneous coupling between said cavities.

6. A spectrometer as in claim 5 wherein said means for minimizing the coupling between said cavities comprises adjusting screws positioned so as to be movable tangent to the common surface region and into said iris.

References Cited

A. M. Portis & Dale Teaney—Microwave Faraday Rotation—Jour. of App. Phys. 29 (12) 12/62, pp. 1692–98.

P. P. Sorokin & J. Lasher & I. L. Gelles—Cross Relaxation Studies in Diamond. Phys. Rev., 118 (4), May 15, 1960, pp. 939–945.

RUDOLPH V. ROLINEC, Primary Examiner

M. J. LYNCH, Assistant Examiner

U.S. Cl. X.R.
333—83